March 26, 1957  G. W. HUGHES  2,786,279
DECLIVITY LEVEL
Filed June 21, 1956
FIG. 1.
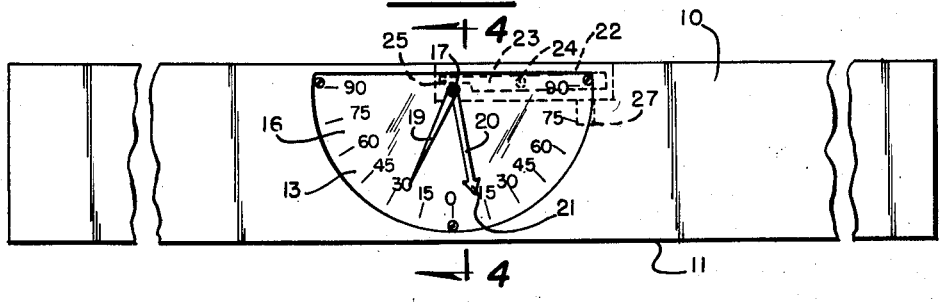
FIG. 2.
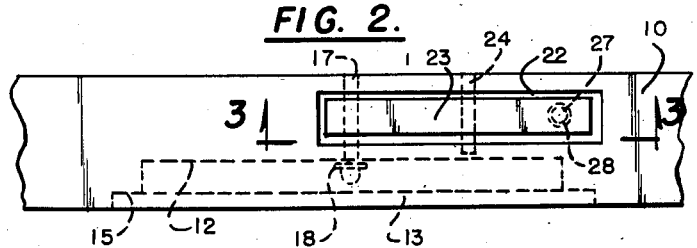
FIG. 3.
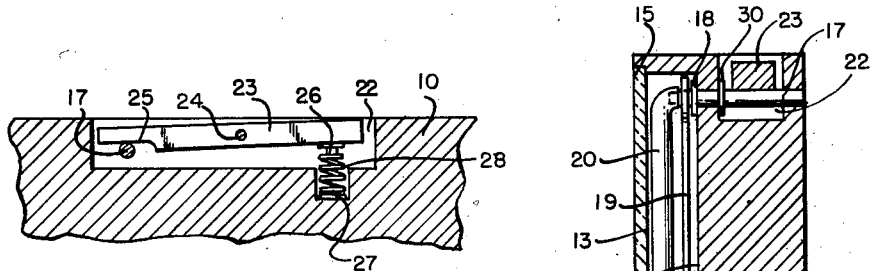
FIG. 4.
INVENTOR
GEORGE W. HUGHES United States Patent Office 2,786,279
Patented Mar. 26, 1957

2,786,279
DECLIVITY LEVEL
George W. Hughes, Plainfield, N. J.
Application June 21, 1956, Serial No. 592,931
5 Claims. (Cl. 33—221)

This invention relates to levels.

It is an object of the present invention to provide a declivity level which may be used to measure the angle of declivity on building weys for ships, on roofs, plumbing layouts and the like.

It is another object of the present invention to provide a declivity level of the above type which includes a free motion indicator and a releasable frictionally retained indicator whereby the angles of different surfaces may be compared with each other by comparing the reading of the free motion indicator with the reading of the frictionally retained indicator from a previous setting.

Other objects of the invention are to provide a declivity level bearing the above objects in mind which is of simple construction, has a minimum number of parts, is inexpensive to manufacture and efficient in operation.

For other objects and for a better understanding of the invention, reference may be had to the following detailed description taken in connection with the accompanying drawing in which:

Figure 1 is a front elevational view of a preferred embodiment of the present invention;

Fig. 2 is a top plan view thereof;

Fig. 3 is a vertical sectional view taken along the line 3—3 of Fig. 2; and

Fig. 4 is a vertical sectional view taken along the line 4—4 of Fig. 1.

Referring now more in detail to the drawing, 10 indicates the level frame of rectangular shape having a true lower edge 11 adapted to rest on the supporting surface, the inclination of which is being measured, substantially as illustrated.

The body 11 on the front face thereof is provided with a semicircular recess 12 of appreciable depth and across which is secured the glass cover plate 13 by means of the screws 14, the cover plate 13 fitting within the minor recess 15 provided on the front face of the body surrounding the recess 12.

A scale 16 is mounted on the inner wall of the recess 12 and indicates the angle of declivity from the horizontal, substantially as illustrated, with the marking extending from zero degrees at the center of the scale to ninety degrees at each end.

A transverse shaft 17 is journalled through the body 10 (Fig. 4) at the top center of the scale 16, rearward displacement of the shaft 17 through the level body being prevented by the snap ring 18 adapted to abut the dial.

A free motion indicator 19 is pivotally mounted on the forward end of the shaft 17 and will fall to plumb when the level is used. The indicator 19 at the upper end is provided with a circular opening which rotatably receives the shaft 17 therethrough, as will be obvious.

A second indicator 20 is fixedly carried on the forward end of the shaft 17 and extends downwardly therefrom and parallel to the free motion indicator 19, terminating in the point 21, also adapted to cooperate with the scale 16, as will hereinafter become clear.

The level body 10 at the upper edge thereof is provided with a rectangular longitudinally extending recess 22 through one end of which passes the shaft 17 at the center thereof.

An elongated releasing lever 23 is pivotally mounted at its central portion within the center of the recess 22 by means of the pin 24 and is provided at one end on the undersurface thereof with the relieved portion 25 which overlies and is adapted to engage the shaft 17.

The lever 23 at the other end thereof on the undersurface fixedly carries a pin 26 which overlies a cylindrical recess 27 provided in the body 10 and communicating with the recess 22. A coil spring 28 is positioned within the recess 27 resting at the lower end of the latter with the upper end thereof being received on the pin 26 whereby to normally urge the other end of the lever and more particularly the relieved portion 25 thereof into engagement with the shaft 17 whereby to frictionally retain the rotational position of the same.

A second snap ring 30 is positioned on the shaft 17 and is adapted to abut the forward face of the slot 22 whereby to limit the forward displacement of the shaft.

In operation, the frame or body 10 is placed on any surface and the free motion or neutral indicator 19 will swing to plumb to indicate the declivity on the scale 16. The releasing lever 23 is then pressed downwardly over the spring 28 and against the action of the latter, to release the indicator 20, which will then swing to the plumb or angle. The finger is then released from the lever 23 to frictionally retain the indicator 20 in the position it has previously swung to. The indicator 20 will be retained in position by the spring 28. Now, the level may be moved to any other surface and the indicator 20 will remain in position. If you wish to check an angle on some other surface, the indicator 19 will swing to the angle, with the first angle still recorded by the frictionally retained indicator 20.

The invention is particularly useful for putting heads, collars and the like on tanks or structures that are not level or plumb at the time of alteration or construction and consequently time can be saved by using the declivity level. The declivity may easily be transferred to any work being done, thereby making parts fit more accurately, even if the work must be performed away from the project. With this level, the gravity does the work for you more accurately.

While various changes may be made in the detail construction, it shall be understood that such changes shall be within the spirit and scope of the present invention as defined by the appended claims.

What I claim as new and desire to protect by Letters Patent of the United States is:

1. A declivity level comprising an elongated body member having an accurately plane lower edge adapted to rest on the surface the declivity of which is being measured, said body on the front face thereof having a recessed portion, a scale on said recessed portion adapted to indicate the declivity, a shaft journalled in said body at the top central portion of said scale, a free motion indicator rotatably mounted at its upper end on the forward end of said shaft adapted to indicate the declivity by free motion in cooperation with said scale when the body is placed on the surface, a second indicator fixedly connected to the forward end of said shaft and extending parallel to said first indicator, and releasable means for holding the position of said second indicator so as to retain the reading for the next operation.

2. A declivity level according to claim 1, said body on the upper edge thereof having an elongated slot receiving said shaft therethrough at one end, said releasable means comprising a release lever pivotally mounted at its central portion within said elongated slot and being formed on the undersurface thereof at one end with a relieved portion adapted to frictionally engage said shaft whereby to brake the same, and spring means at the other end of said lever for maintaining said relieved portion in pressurized contact with said shaft and permitting its release when said lever is pressed manually downwardly against the action of said spring means.

3. A declivity level according to claim 2, said spring means comprising a depending pin carried by said lever at one end remote from said cutout, said body having a cylindrical recess below said pin communicating with said elongated slot and a coil spring positioned within said recess with the upper end thereof surrounding said pin.

4. A declivity level according to claim 3, said recess on the front face of said body member being substantially semicircular with the straight edge disposed uppermost, said body member on the front face thereof having a second recess surrounding said first recess, a transparent semicircular cover plate postioned within said second recess and fastening means securing said cover plate to said body member.

5. A declivity level according to claim 4, including a first snap ring positioned on said shaft adapted to abut the inner face of said first recess, and a second snap ring positioned on said shaft adapted to abut the forward face of relieved portion whereby to limit the displacement of said shaft therethrough.

References Cited in the file of this patent
UNITED STATES PATENTS

| | | |
|---|---|---|
| 861,660 | King et al. | July 30, 1907 |
| 922,960 | Schatz | May 25, 1909 |
| 1,120,737 | Nielsen | Dec. 15, 1914 |
| 1,239,336 | Bair et al. | Sept. 4, 1917 |
| 2,170,824 | Lichtenwalner | Aug. 29, 1939 |
| 2,383,527 | Whitechester | Aug. 28, 1945 |